Nov. 4, 1952   J. F. HEALY   2,616,474

LAMINATED SPRING DISK LOCK NUT

Filed June 6, 1950   2 SHEETS—SHEET 1

Inventor
Joseph F. Healy
By Wooster & Davis Attorneys

Nov. 4, 1952     J. F. HEALY     2,616,474
LAMINATED SPRING DISK LOCK NUT

Filed June 6, 1950     2 SHEETS—SHEET 2

Inventor
Joseph F. Healy
By Wooster & Davis Attorneys

Patented Nov. 4, 1952

2,616,474

UNITED STATES PATENT OFFICE 2,616,474

LAMINATED SPRING DISK LOCK NUT

Joseph F. Healy, Westport, Conn., assignor to Harvey Hubbell, Incorporated, Bridgeport, Conn., a corporation of Connecticut Application June 6, 1950, Serial No. 166,377

5 Claims. (Cl. 151—7)

This invention relates to machine nuts commonly employed on threaded members, such as bolts and the like. Such nuts are usually made from relatively expensive bar stock, and an object of this invention is to provide an improved nut of such construction as to be easily manufactured from relatively inexpensive sheet stock, thus greatly reducing the cost.

A further object is to provide a nut formed from sheet stock and arranged to embody an inherent locking action which resists loosening of the nut on the associated threaded member to which it is applied.

A further object is to provide a nut having a resilient threaded bore of such form that when applied to a threaded element it will grip the thread of such element substantially throughout the entire area of contact.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 4 being a top view and Fig. 5 a bottom view;

Figure 2:
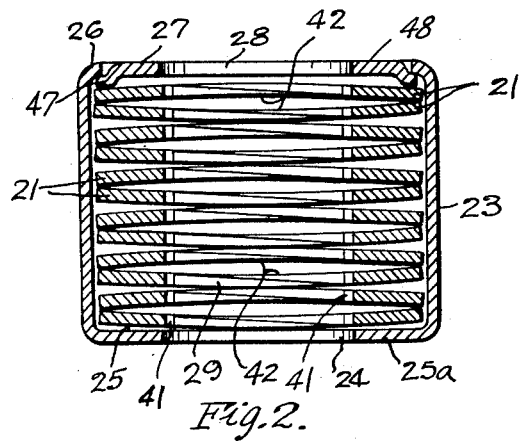
Fig. 2 is a section through the nut shown in Fig. 1 on an enlarged scale with certain features greatly exaggerated.
Figure 1:
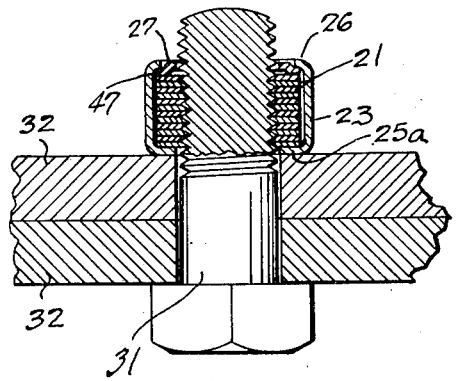
Fig. 1 is a section through a nut constructed in accordance with one embodiment of the invention showing it operatively applied to a fastening bolt.

As illustrated in Figs. 1 and 2, the invention comprises a plurality of annular disks 21 each of which is stamped from sheet metal and formed with a center opening 22 which is threaded as hereafter described. In forming the nut of the present invention a plurality of disks 21 are arranged in alignment and side by side, and the assembled disks are housed in a cup-shaped casing 23 having an opening at one end surrounded by a pressure surface 25 on an inturned flange or lip 25a engaging the adjacent end disk 21. The other end of the casing 23 is open and has an inturned lip 26 which extends inwardly to engage and hold the edge of a retaining end washer 27 having an opening 28 aligned with the openings 22 in the disks 21. The aligned openings in the disks 21, the casing 23, and the end washer 27 provide a threaded bolt opening 29 extending through the assembly, and form a machine nut capable of being used in the normal manner, but composed entirely of parts which can be easily and cheaply made from sheet stock. Thus the need of using relatively expensive bar stock is entirely avoided. The nut is applied in the usual way to a threaded fastening member such, for example, as a bolt 31 to secure parts 32 or the like together. As illustrated, the disks 21, end washer 27 and casing 23 are hexagonal to provide a conventional nut form, but could be of other shapes if desired.

Figure 7:
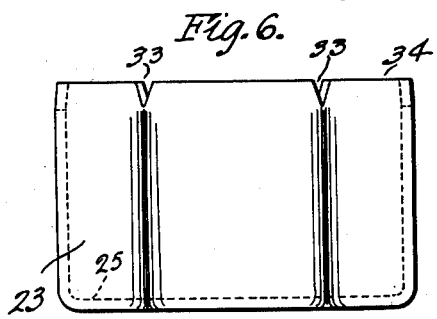
Fig. 7 is a side elevation of the casing shown in Fig. 6.
Figure 8:
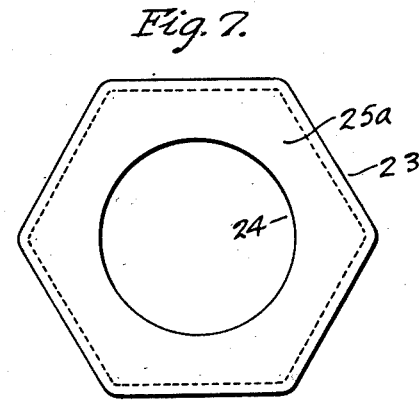
Fig. 8 is an end view of the casing showing the end opposite that shown in Fig. 6.

The casing 23 is first formed preferably from sheet metal to provide the cup shape illustrated in Fig. 7, V-notches 33 being formed in each corner of the upper edge 34 to facilitate later bending the edge inwardly to provide the washer-retaining flange or lip 26. The disks 21 are assembled in the open cup with the bottom disk engaging the pressure surface 25, and the end washer 27 positioned on top, after which the upper edge 34 is bent inwardly to provide the retaining lip 26 which engages and holds the outer edge of the end washer 27.

Figure 9:
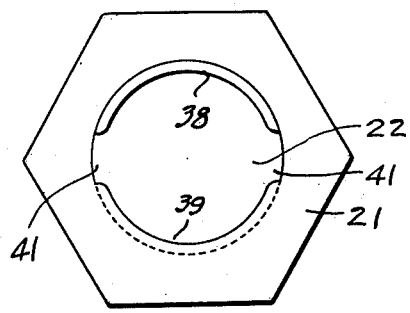
Figs. 9 and 10 are side and end views, respectively, of one of the nut forming sheet metal disks employed in the present invention.
Figure 10:
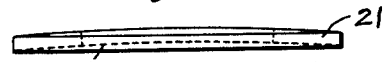

The opening 22 in each disk 21 is threaded by swaging with suitable tools after the disks themselves are blanked out from sheet stock. Due to the cross over of the spiral threads, a complete thread is not swaged in a single disk. Usually, one-half of a thread will be swaged in each disk. In each disk part of a thread is swaged on one side 38 of the center opening 22 and part of a thread on the opposite side 39, the spaces 41 between providing for the cross-over of the spiral thread. Thus where two disks form a complete thread one half thickness of the thread is swaged on one side of opening 22 in each disk as shown at 38, Fig. 9, corresponding to one half thread thickness on one side of a bolt, and the other half thickness of a thread is swaged on the opposite side of the opening 22 as shown at 39, Fig. 9, corresponding to the other half thickness of thread on the opposite side of the bolt so that when two disks are reversed and placed face to face with their concave sides opposed, and they are drawn together by threading on the bolt, the two surfaces come together and the half thicknesses of threads on the two disks supplement each other so that together they form a complete or whole thread, as shown in Fig. 1. When a half thread is swaged in each disk and assuming, for example, that there are eleven threads to the inch, there will be twenty-two disks for a one-inch nut, that is, there will be two disks for each complete thread. On the other hand, should one-fourth thread be provided on each disk, there will be four washers for each thread.

The invention includes providing such resilience in the threaded bore as to cause the threads on the nut to grip a bolt thread when applied thereto and lock the nut against unintentional loosening. As illustrated in Fig. 2 on a greatly exaggerated scale, the disks are laterally curved or dished, that is, concavo-convex, concave on one side 42 and convex on the opposite side 42a. When assembled in the casing they are arranged in pairs with the concave sides 42 facing each other and the edges in contact.

Because of the dished or concavo-convex form of the disks, the threads of the assembled disks forming each pair are not quite continuous or correct when assembled in the casing 23 prior to applying the nut to a bolt, as shown in Fig. 2. Consequently, as the nut is threaded onto the bolt 31, the bolt thread forces the threads on the flexible disks 21 into continuity and thus draws the disks together. In practice, the cupping or dishing of each disk 21 is relatively slight, usually amounting only to about .008" or .009". This permits the threads on the bolt or similar member entering the discontinuous threads in successive disks and drawing the disks 21 toward each other with a flattening effect, each pair of disks being successively flattened as the threading operation is continued and they are successively engaged by the bolt 31. This flattening of the disks 21 produces a binding pressure or tension due to the resiliency of the metal which is continuously effective between the threads of the nut and those on the bolt, providing a lock nut effect which prevents unintentional loosening of the nut while allowing the nut to be rotated intentionally under wrench pressure or the like, either to apply it or remove it from the bolt. In other words, the thread form of the dish-shaped disks 21 when assembled in the casing 23 is not a true thread until the spring action between each pair of disks is taken up, as the nut is applied to the bolt 31. The action of the bolt 31 in entering the threaded disks 21 draws them together and causes them to form a true thread in relation to the bolt thread. This causes each thread in the nut to engage the bolt thread with a yieldable frictional contact throughout the entire length of the thread and produces the lock action.

If desired, the degree to which the nut thread is discontinuous can be varied by the relative angular setting or adjustment of adjacent disks to control the locking action.

Fig. 1 shows the nut assembled to a bolt 31, and illustrates the flat position the crowned or curved washers and threads assume when engaged by a thread helix or, as above, a series of them. These washers when made of a resilient or springy material will never completely set, but will always grip the bolt thread and will not depend on wrench pressure or tension to lock it. This construction is particularly adapted to large sizes of nuts where the machining from bars is expensive, also where the harder nickel alloys are required. With proper equipment, rapid production is possible at lower cost.

Figure 4:
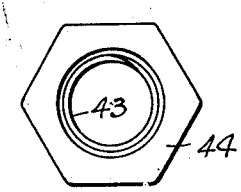
Figs. 4 and 5 are end elevations of the opposite ends of the nut shown in Fig. 3.
Figure 3:
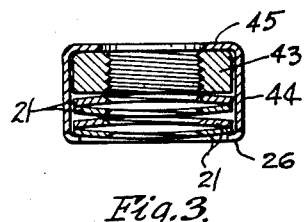
Fig. 3 is a section through a nut constructed in accordance with another embodiment of the invention.
Figure 5:
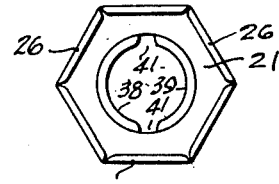
Figure 6:
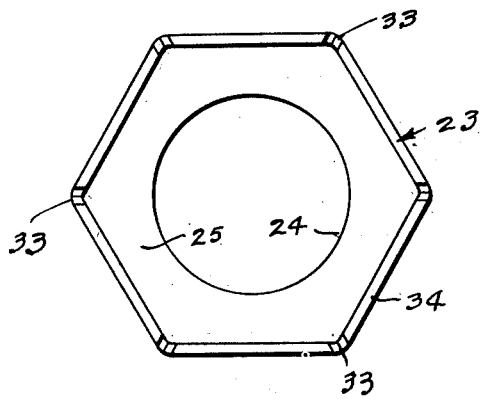
Fig. 6 is an end view of a casing member forming one element of the present invention.

In the embodiment illustrated in Figs. 3, 4 and 5, the invention includes a solid nut 43 in a casing 44 with a plurality of pairs of the dish-shaped disks 21. This provides a continuous nut thread for substantially one-half the nut, with the remainder of the thread being the resilient locking thread of the present invention, formed by the disks 21. The pressure surface 45 of the casing 44 bears on the end of the solid nut section 43. Although no retaining washer is shown in this modification, one may be employed if desired. As illustrated, the retaining lip 26 of the casing 23 directly engages the end disk. When applied to a bolt or the like the disks 21 are caused to flatten and apply a binding pressure to the threads of the bolt, in the above described manner.

Figure 11:
Fig. 11 is a section through the disk of Figs. 9 and 10.
Figure 12:
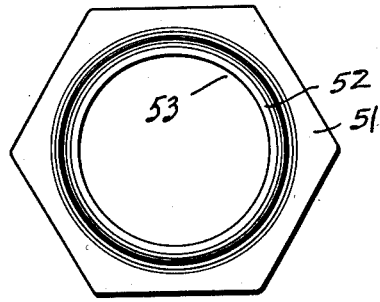
Fig. 12 is a plan view of a modified form of washer forming a part of the finished nut.
Figure 13:
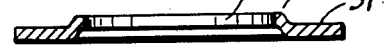
Fig. 13 is a section thereof.

As illustrated in Fig. 2, the retaining washer 27 has a peripheral edge 47 offset sufficiently to fit under the retaining lip 26 of the casing 23 and allow the outer face 48 to be substantially flush with the end of the casing 23. Figs. 11 and 12 show a modified construction of washer 51 having an offset inner edge 52 around the opening 53 therein which can be employed if desired.

The present invention not only provides a strong, rugged machine nut made from relatively inexpensive sheet stock, but also one in which a resilient threaded bore automatically provides a lock action throughout the length of the bore upon application of the nut to a threaded bolt or other fastening member. In use, the working of the material of the disks in applying the nut and removing it from a fastening member will have a hardening and strengthening effect. The invention is capable of extremely rapid manufacture and assembly on automatic machinery.

Having thus set forth the nature of my invention, I claim:

1. A machine nut including a pair of annular disks having concave sides facing each other, means holding said disks in contact at their edges, said disks having aligned threaded openings forming the nut bore, the threads in each disk being a partial thread thick with the thread in one disk being sufficiently discontinuous with relation to the thread in the other disk so that a threaded bolt or the like threaded into said bore draws said disks and partial threads together to form a discontinuous substantially full thickness thread conforming to the continuous thread of the bolt, whereby said disks are flexed and pressed together to cause the threads thereon to engage the bolt thread with a resilient spring pressure providing a nut lock action.

2. A machine nut including a pair of annular disks of resilient sheet material having concave sides facing each other, means holding said disks in contact at their edges, said disks having aligned threaded openings forming the nut bore, the threads in the respective disks being substantially a half thread thick and sufficiently discontinuous so that a threaded bolt or the like threaded into said bore draws said disks and half threads together to form a discontinuous substantially full thickness thread conforming to the thread of the bolt, whereby said disks are flexed and pressed together to cause the threads thereon to engage the bolt thread with a lateral spring pressure providing a locking action throughout the length of bore formed by said disks.

3. A machine nut including a plurality of annular disks of resilient sheet material slightly concaved on one side arranged in superimposed pairs with the concave sides facing each other, means holding said disks in contact to form a laminated nut body, said disks having aligned threaded openings forming the nut bore, the threads in each disk being substantially a half thread thick with the threads in successive disks being sufficiently discontinuous so that a threaded bolt or the like threaded into said bore draws said disks and half threads together to form a discontinuous substantially full thickness thread conforming to the thread of the bolt, whereby said disks are flexed and pressed together to cause the threads thereon to engage the bolt thread with a lateral spring pressure providing a locking action.

4. A machine nut comprising a plurality of resilient annular sheet metal slightly concavo-convex disks arranged in superimposed pairs with the concave sides facing each other, said disks having aligned threaded openings forming the nut bore, a cup-shaped sheet metal casing having a hole in the bottom alined with said bore and holding said disks in contact to form a laminated nut body, and means retaining said disks in said casing, the threads in each disk being substantially a half thread thick with the threads in adjacent disks being sufficiently discontinuous so that a threaded bolt or the like threaded into said bore draws said disks and half threads together to form a discontinuous substantially full thickness thread conforming to the thread of the bolt, whereby said disks are flexed to cause the threads thereon to engage those on the bolt with a resilient pressure throughout the length of the bore to provide a locking action.

5. A machine nut comprising a plurality of resilient annular sheet metal slightly concavo-convex superimposed disks arranged in pairs with the concave sides facing each other, said disks having aligned threaded openings forming the nut bore, a cup-shaped sheet metal casing having a hole in the bottom aligned with said bore and holding said disks in contact to form a laminated nut body, and means retaining said disks in said casing including a disk-retaining washer in the open end of said casing and a washer engaging lip on said casing and extending inwardly and engaging the edge of said washer, the threads in each disk being substantially a half thread thickness with the threads in adjacent disks being sufficiently discontinuous so that a threaded bolt or the like threaded into said bore draws said disks together to form a discontinuous substantially full thickness thread conforming to the thread of the bolt, whereby said disks are flexed to cause the threads thereon to engage those on the bolt with a resilient pressure throughout the length of the bore to provide a locking action.

JOSEPH F. HEALY.

REFERENCES CITED

The following references are of record in the file of this patent:

UNITED STATES PATENTS

| Number | Name | Date |
|---|---|---|
| 1,126,225 | Judick | Jan. 26, 1915 |
| 1,161,317 | Kielland | Nov. 23, 1915 |
| 1,352,201 | Kennedy | Sept. 7, 1920 |
| 1,468,074 | Pierce | Sept. 18, 1923 |
| 2,330,102 | Yarnall | Sept. 21, 1943 |
| 2,410,730 | Gwyn | Nov. 5, 1946 |